Aug. 15, 1933.  G. WALTHER  1,923,028

METAL WHEEL

Filed July 27, 1927  2 Sheets-Sheet 1

INVENTOR,
George Walther,
BY
ATTORNEY.

Aug. 15, 1933. G. WALTHER 1,923,028
METAL WHEEL
Filed July 27, 1927 2 Sheets-Sheet 2
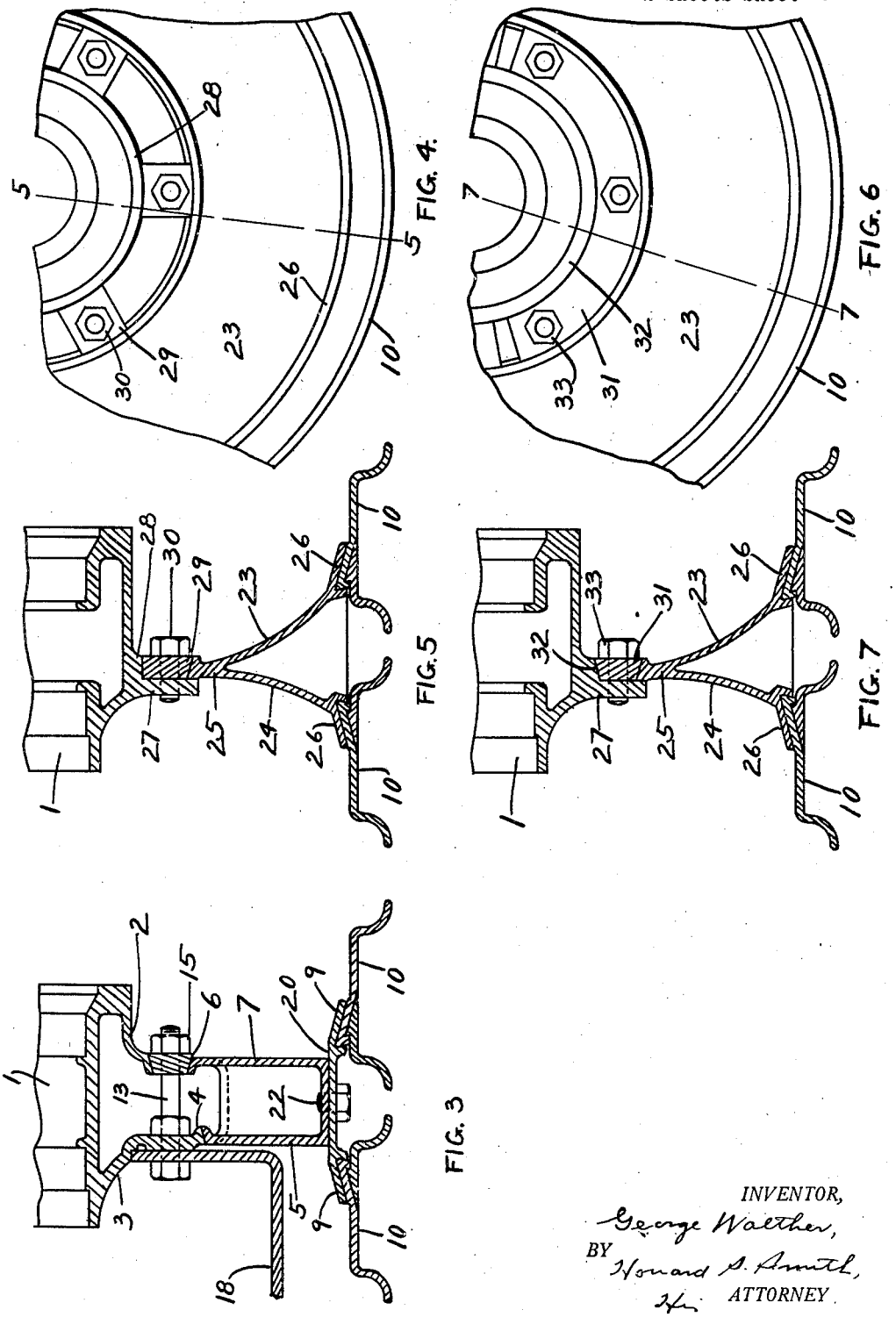

Patented Aug. 15, 1933

1,923,028

UNITED STATES PATENT OFFICE 1,923,028

METAL WHEEL

George Walther, near Dayton, Ohio, assignor to The Dayton Steel Foundry Company, Dayton, Ohio, a Corporation of Ohio Application July 27, 1927. Serial No. 208,781

5 Claims. (Cl. 301—9)

This invention relates to new and useful improvements in metal wheels.

It is one of the principal objects of my invention to provide a metal wheel having a removable tire rim supporting section which is more quickly demountable at the hub than a full wheel. The tire rims are never out of round with the hub and will not wobble.

It is another object of my invention to provide a metal wheel having a removable spider section which, after the tire rims are applied to the stationary spider section, will be forced outwardly by a wedge ring against said rims to tighten them all around. The demountable spider section may also be quickly taken off without the necessity of removing any rim bolts as in the ordinary wheel, since this wheel does not have them. The sectional spider has an integral or connected felloe to receive the tire rims, and is itself bolted to an extended part of the hub, first the section to which the rims are applied, and then the loose section that is forced outwardly against said rims by the wedge ring or nuts.

Other important and incidental objects will be brought out in the following specification and particularly set forth in the subjoined claims.

Figure 1:
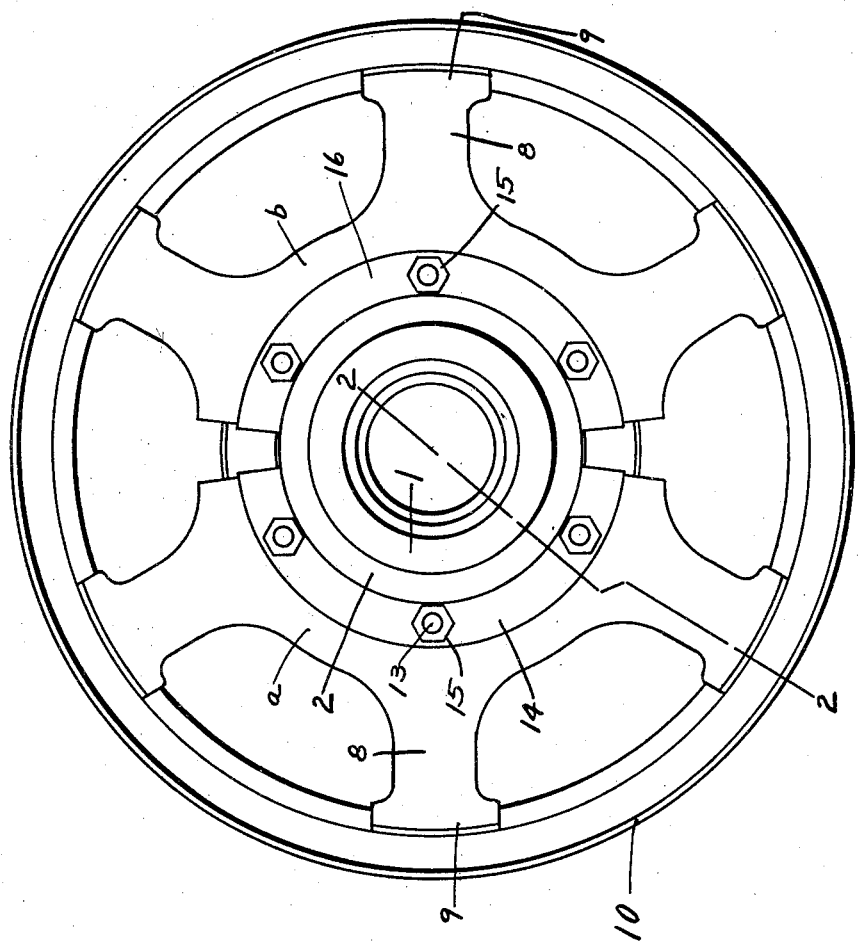
Figure 2:
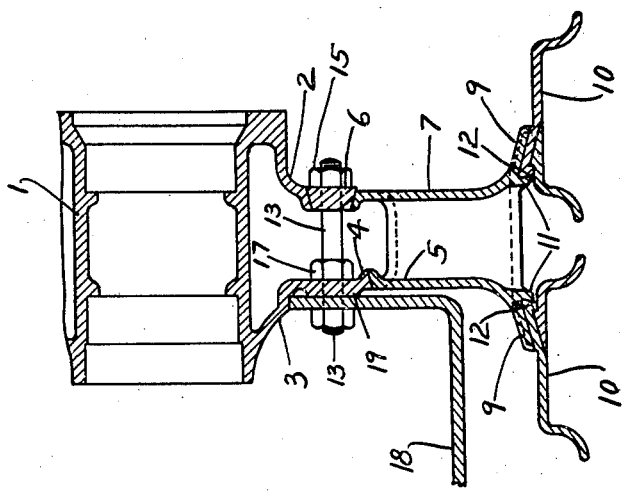

In the accompanying drawings, Figure 1 is a side elevational view of my improved metal wheel. Figure 2 is a radial sectional view taken through the wheel on the line 2—2 of Figure 1. Figure 3 is a radial sectional view taken through a similar metal wheel, showing a felloe bolted to the spider. Figure 4 is a side elevational view of a portion of my improved metal wheel employing wedge nuts for securing the tire rim support to the hub. Figure 5 is a sectional view taken through said wheel on the line 5—5 of Figure 4. Figure 6 is a side elevational view of said wheel, showing a wedge ring for connecting the Y shaped tire rim support to the hub. And Figure 7 is a sectional view taken through the wheel on the line 7—7 of Figure 6.

Referring to the accompanying drawings for a detailed description of the forms of embodiment of my invention therein shown, the numeral 1 designates in Figures 1 and 2 the hub of a metal wheel. Formed on this hub are two radial extensions 2 and 3. The inner extension 3 is formed with a circumferential series of bolt holes beyond which said section terminates in a beveled seat 4 for the beveled inner periphery of the inside portion 5 of a sectional spider. The outside hub extension 2 is also formed with a beveled seat for a wedge ring 6 upon which the beveled inner periphery of the outer portion 7 of the sectional spider is adapted to seat.

In the form shown, the spider has spoke portions 8. Formed on the parts 5 and 7 of each spoke portion are tapered seats 9, 9 respectively for tire rims 10, 10, a spacer projection 11 being provided on each rim seat 9 for engagement by the beveled projection 12 upon its respective tire rim 10.

The spider, as has been before brought out, is in two loose sections, one of which will be designated a and the other b in Figure 1. The loose section a is first applied to the hub extensions 2 and 3 by bolts 13 which are passed through the bolt holes in the extension 3 and through holes alined with them in a semi-circular section 14 of a wedge ring that is inserted between the beveled periphery of the hub extension 2 and the beveled periphery of the part 7 of the spider section a. Nuts 15 are then applied to the bolts 13 and the loose spider section a is held on the hub 1, while the tire rims 10, 10 are applied to the rim seat 9 and the nuts tightened.

From the outside, the loose spider section b is then applied to the wheel between the extended hub portions 2 and 3 and the tire rims 10, 10. Bolts 13 are passed through the bolt holes in the part 5 of said removable spider section b and the complemental part 16 of the wedge ring slipped over them. Nuts 15 are then applied to the bolts to press the wedge ring inwardly, whereupon the loose spider section b will be forced outwardly against the tire rims to hold them tight all around the wheel. When so secured to the wheel, they will not be out of round with the hub nor will they wobble. Furthermore, the tire rims may be easily taken off by removing the spider section b.

By separate bolts 17, or by the bolts 13, if desired, I secure a brake drum 18 to the hub extension part 3 against an annular protuberance 19 thereon as shown in Figure 2.

In Figure 3 I have shown a non-integral felloe 20 for each spoke section 8 of the spider, and secured to a connected part of it by fastening elements such as studs 22.

In Figures 4 and 5 a split tire rim support substantially Y shape in longitudinal section is employed. The parts 23 and 24 of it incline outwardly from an inner disc part 25 and terminate at their outer peripheries in beveled tire rim seats 26 similar to the rim seats 9. The hub in this instance is formed with a disc extension 27 provided with bolt holes and a pilot shoulder 28. The disc portion 25 of the tire rim support bears against the outer part of the hub extension 27 and is formed with a beveled edge for engagement by wedge clamps 29. These wedge clamps 29 are tightly forced between the pilot shoulder 28 and the beveled edge of the tire rim support by fastening elements such as studs 30, which pass through holes in the clamps and the holes in the hub extension 27, to secure the split tire rim support tightly to the hub.

In Figures 6 and 7 a split tire rim support similar to that shown in Figures 4 and 5 is employed, save that it is secured to the hub by a split wedge ring 31 for which there is a narrow beveled seat 32 on the hub 1. By means of fastening elements such as the studs 33, the wedge ring 31 is forced inwardly between the seat 32 and the tire rim support to secure the latter tightly to the hub.

Having described my invention, I claim:

1. A metal wheel comprising a spider which is formed in two independent radial sections adapted to be wedged outwardly into engagement with a tire rim, and arcuate wedge members by means of which said radial sections are wedged outwardly into engagement with said rim one of said radial sections being removable, independent of the other section, to permit the demounting of the rim.

2. A metal wheel comprising a spider which is formed in two independent radial sections adapted to be wedged outwardly into engagement with a tire rim, and half wedge rings by means of which said radial sections are wedged outwardly into engagement with said rim one of said radial sections being removable, independent of the other section, to permit the demounting of the rim.

3. A metal wheel comprising a hub and two independent radial spider sections, a tire rim for said sections, and half wedge rings between the latter and the hub by means of which said radial spider sections are wedged outwardly into engagement with said rim one of said radial sections being removable, independent of the other section, to permit the demounting of the rim.

4. A metal wheel comprising a spider which is formed in two radial sections adapted to be wedged outwardly into engagement with a tire rim, and a pair of arcuate wedge members by means of which said radial sections are wedged outwardly into engagement with said rim, one of said spider sections and its respective wedge member being removable to permit the demounting of the rim.

5. A metal wheel comprising a spider which is formed in two radial sections adapted to be wedged outwardly into engagement with a tire rim, and a pair of half wedge rings by means of which said radial sections are wedged outwardly into engagement with said rim, one of said spider sections and its respective half wedge ring being removable to permit the demounting of the rim.

GEORGE WALTHER.